US007406607B2

(12) United States Patent
Echizenya

(10) Patent No.: US 7,406,607 B2
(45) Date of Patent: Jul. 29, 2008

(54) CONTROLLER FOR A HOST DEVICE AND A MONITORING DEVICE CONNECTED ON THE BASIS OF DVI STANDARD

(75) Inventor: Toshihito Echizenya, Hachioji (JP)

(73) Assignee: Japan Aviation Electronics Industry Limited, Tokyo (JP)

( * ) Notice: Subject to any disclaimer, the term of this patent is extended or adjusted under 35 U.S.C. 154(b) by 1522 days.

(21) Appl. No.: 10/342,746

(22) Filed: Jan. 14, 2003

(65) Prior Publication Data

US 2003/0132941 A1 Jul. 17, 2003

(30) Foreign Application Priority Data

Jan. 16, 2002 (JP) ............................. 2002-007451

(51) Int. Cl.

| | |
|---|---|
| ***G06F 1/00*** | (2006.01) |
| ***G06F 13/00*** | (2006.01) |
| ***G06F 13/36*** | (2006.01) |
| ***G06F 3/038*** | (2006.01) |
| ***G06F 5/00*** | (2006.01) |
| ***G06F 13/14*** | (2006.01) |

(52) U.S. Cl. ....................... 713/300; 710/304; 710/313; 345/204; 345/520

(58) Field of Classification Search ................. 713/300; 710/304, 313; 345/204, 520
See application file for complete search history.

(56) References Cited

U.S. PATENT DOCUMENTS 6,657,623 B1 * 12/2003 Shin ........................... 345/213
6,753,881 B1 * 6/2004 Callway et al. ............. 345/699
6,940,477 B2 * 9/2005 Moon et al. ................... 345/87
7,075,586 B2 * 7/2006 McIntyre .................... 348/558
2001/0036193 A1 11/2001 Kori
2003/0034963 A1 * 2/2003 Moon et al. ................. 345/204
2003/0197808 A1 * 10/2003 McIntyre .................... 348/554

OTHER PUBLICATIONS

Digital Display Working Group, "Digital Visual Interface DVI" Digital Visual Interface DVI, XX, XX, No. revision 10, Apr. 2, 1999, pp. 1-76.

(Continued)

*Primary Examiner*—Thomas Lee
*Assistant Examiner*—Jaweed A Abbaszadeh
(74) *Attorney, Agent, or Firm*—Gallagher & Lathrop P.C.; David N. Lathrop

(57) ABSTRACT

There is provided a controller that prevents any external power source from supplying its power if a host device and a monitoring device are not connected exactly through optical extension cables based on DVI standard, and that prevents a sequence for digital transmission of a video signal from being started if the external power source remains off. Only when the proper (DDC+5V) signal is generated from the host device and the external power source has been turned on, the (DDC+5V) signal is transmitted to the monitoring device, and when it is detected in the monitoring device that the transmitted signal is the proper (DDC+5V) signal, the (DDC+5V) signal is transmitted to the monitoring device. Also, when it is detected that the proper HPD signal has been generated from the monitoring device, the power of the external power source is supplied to attached circuits of the host device and the monitoring device, and if the HPD signal transmitted to the host device is the proper signal, the HPD signal is transmitted from the monitoring device to the host device.

4 Claims, 12 Drawing Sheets

OTHER PUBLICATIONS

McConnaughey, A Digital-Interface Standard for Displays "The DVI initiative is already changing CRTs for the better and is destined to promote the growth of flat-panel monitors," Information Display, Palisades institute for Research Services; New York, NY, US vol. 16, No. 1, Jan. 2000, pp. 18-21.

Digital Display Working Group, "Digital Visual Interface DVI" Digital Visual Interface DVI, XX, XX, No. revision 10, Apr. 2, 1999, pp. 1-76.

* cited by examiner

CONTROLLER FOR A HOST DEVICE AND A MONITORING DEVICE CONNECTED ON THE BASIS OF DVI STANDARD

BACKGROUND OF THE INVENTION

1. Field of the Invention

The present invention relates to a sequence controller for a host device and a monitoring device connected with each other on the basis of DVI (Digital Visual Interface) standard, and more particularly, to a controller adapted to ascertain, when the host device and the monitoring device are connected with each other through optical extension cables each based on DVI standard, whether these host device and monitoring device have been exactly connected with each other through the optical extension cables or not as well as to ascertain whether a power from an external power source or supply has been supplied to attached circuits of the host device and the monitoring device or not.

2. Description of the Related Art

In recent years, DVI standard is used in case of digitally transmitting a video signal from a host device (for example, a computer) to a monitoring device (for example, a device including a liquid crystal display (LCD)). The DVI standard adopts a digital transmission system called T.M.D.S. Briefly explaining, the host device has, for example, a T.M.D.S. transmitter and a DVI connector provided therein and the monitoring device has a T.M.D.S. receiver and a DVI connector provided therein, and the DVI connector of the host device is connected to the DVI connector of the monitoring device through extension cables each based on the DVI standard. A video signal digitally produced in the host device is transmitted from a video controller of the host device through the T.M.D.S. transmitter and the DVI connector to the extension cables, and in the monitoring device, the digital video signal is received by the T.M.D.S. receiver and sent therefrom to a display controller in which the received digital signal is processed to obtain a signal adapted for a display of the monitoring device. Then, the signal is sent to a display driver to display a picture or image corresponding to the digital video signal on the display.

Here, DVI is an abbreviation for Digital Visual Interface as mentioned above, and one of interface standards defined by DDWG (Digital Display Working Group) which is an organization of computer industry for the purpose of digitally transmitting a video signal to be supplied to a liquid crystal display, cathode ray tube display, and the like. T.M.D.S. is an abbreviation for Transition Minimized Differential Signaling, which is a digital transmission system for video signals developed by Silicon Image Company Ltd, in U.S. A. and transmits a serial digital signal by differential driving by use of two signal lines. As is well known, in DVI standard, one color component signal of a color video signal is transmitted using one channel of T.M.D.S., and all color component signals, namely, R (red) component signal, G (green) component signal, and B (blue) component signal of the color video signal using three channels of T.M.D.S. In addition thereto, one channel of T.M.D.S. is used for transmission of clock.

In case of connecting the host device and the monitoring device with each other through the extension cables (metal extension cables, optical extension cables or the like) each based on DVI standard as described above, it is necessary to ascertain whether the host device and the monitoring device are exactly connected with each other through the extension cables or not. In general, DDC is used to ascertain whether both devices are exactly connected with each other. DDC is a standard defined by VESA in U.S. A. for the purpose of realizing Plug and Play of a display. Further, VESA is an abbreviation for Video Electronics Standards Association, and DDC is an abbreviation for Display Data Channel. Plug and Play (PnP) of a display is a system in which when a display is connected to a host device, OS (operating system) of the host device automatically detects the display and the optimum setting therefor is automatically carried out without manual setting work by a user. In order to materialize this Plug and Play of a display, DDC standard uses three signals of DDC data, DDC clock, and DDC+5V (DC voltage of +5V).

FIG. 10 is a flow chart showing one prior art process for ascertaining whether a host device and a monitoring device are exactly connected with each other or not by use of DDC standard. Since DDC data and DDC clock are low speed signals, and DDC+5V signal and HPD signal that is a return signal of the DDC+5V signal are direct current signals, these signals are transmitted and received via metal extension cables each based on DVI standard, though not shown.

As shown in FIG. 10, at first, a (DDC+5V) signal source provided in the host device (for example, computer) H is caused to turn on in a step 11, and in the next step 12, a (DDC+5V) signal is outputted from the (DDC+5V) signal source and is transmitted to the monitoring device M via a metal extension cable based on DVI standard. In the monitoring device M, it is determined in a decision step 23 whether the transmitted (DDC+5V) signal is the proper (DDC+5V) signal or not. In case it is the proper (DDC+5V) signal, the decision step 23 outputs "Yes" signal, and the process proceeds to a step 22. In the step 22, a HPD signal (a return signal of the (DDC+5V) signal) is generated from a HPD signal source (not shown) provided in the monitoring device M, and is transmitted to the host device H via a metal extension cable based on DVI standard. The HPD signal transmitted to the host device H is determined whether it is the proper HPD signal or not in a decision step 13 of the host device H. In case it is the proper HPD signal, the decision step 13 outputs "Yes" signal, and in the next step 14, a sequence for digitally transmitting a video signal is started.

Further, HPD is an abbreviation for Hot Plug Detect, is established by VESA, and is a standard for enabling a display or other peripheral equipment to pull out and/or plug in without turning off the power supply to the host device H and/or the monitoring device M. For example, when a display of the monitoring device M is pulled out from and then plugged in the monitoring device M, the host device automatically detects this fact and newly carries out the plug and play of the display. Accordingly, the fact that the proper HPD signal has been detected in the host device H indicates that the display is exactly connected to the monitoring device M.

Next, there is shown in FIG. 11 one example of the construction of the prior art that uses T.M.D.S. transmission system and optical extension cables in order to digitally transmit a video signal at high speed, and that uses DDC standard and metal extension cables for the purpose of ascertaining whether a host device and a monitoring device are exactly connected with each other or not.

FIG. 11 is a connection diagram showing a connecting manner between a host device H and a monitoring device M. In an interface 1 of the host device H, there are provided three pairs of terminals (six terminals) for transmitting one set of T.M.D.S. data 0 for differential driving corresponding to, for example, R component of a color video signal, one set of T.M.D.S. data 1 for differential driving corresponding to, for example, G component thereof, and one set of T.M.D.S. data 2 for differential driving corresponding to, for example, B component thereof; one pair of terminals (two terminals) for transmitting one set of T.M.D.S. clocks for differential driving; one terminal for transmitting (DDC+5V) signal; one terminal for transmitting and receiving DDC clock; one terminal for transmitting and receiving DDC data; one terminal for receiving HPD signal; and one ground terminal.

On the other hand, in an interface 2 of the monitoring device M, there are provided three pairs of terminals (six terminals) for receiving one set of T.M.D.S. data 0 for differential driving corresponding to R component transmitted from the host device H, one set of T.M.D.S. data 1 for differential driving corresponding to G component, and one set of T.M.D.S. data 2 for differential driving corresponding to B component; one pair of terminals (two terminals) for receiving one set of T.M.D.S. clocks for differential driving; one terminal for receiving (DDC+5V) signal; one terminal for receiving and transmitting DDC clock; one terminal for receiving and transmitting DDC data; one terminal for transmitting HPD signal; and one ground terminal.

In order to digitally transmit T.M.D.S. data 0-2 corresponding to R component, G component, and B component of a color video signal as well as T.M.D.S. clocks at high speed from the host device H to the monitoring device M, an attached circuit 61 of the host device H and an attached circuit 81 of the monitoring device M are connected with each other through four optical extension cables 4-1, 4-2, 4-3, and 4-4. Four transform devices TR1, TR2, TR3, and TR4 are provided in the attached circuit 61 of the host device H, and three devices TR1-TR3 are differentially driven by corresponding sets of T.M.D.S. data 0, 1, and 2 for differential driving, thereby to output serial digital signals, respectively, and the remaining one device TR4 is differentially driven by one sets of T.M.D.S. clocks for differential driving, thereby to output a serial clock. Moreover, to the output circuits of these transform devices TR1, TR2, TR3, and TR4 are connected electric-optic conversion elements, for example, semiconductor laser diodes LD1, LD2, LD3, and LD4, respectively. The transform devices TR1-TR4 and laser diodes LD1-LD4 constitute an electric-optic conversion circuit 15. One ends of the optical extension cables 4-1, 4-2, 4-3, and 4-4 are optically coupled to the laser diodes LD1, LD2, LD3, and LD4, respectively. Thus, the T.M.D.S. data 0-2 corresponding to R, G, B components of a video signal and T.M.D.S. clocks for synchronizing the T.M.D.S. data 0-2 are converted into serial optical digital signals, respectively, by the electric-optic conversion circuit 15, which in turn are transmitted to the monitoring device M through the optical extension cables 4-1 to 44 based on DVI standard.

Likewise, in the attached circuit 81 of the monitoring device M is provided a photoelectric conversion circuit 25 which is constituted by four photoelectric conversion elements, for example, photodiodes PD1, PD2, PD3, and PD4, and four inverse transform devices RTR1, RTR2, RTR3, and RTR4. The photodiodes PD1, PD2, PD3, and PD4 are optically coupled to the other ends of the optical extension cables 4-1, 4-2, 4-3, and 4-4, respectively. The inverse transform devices RTR1, RTR2, RTR3, and RTR4 function to inversely transform electric signals outputted respectively from the photodiodes PD1, PD2, PD3, and PD4 into the original sets of T.M.D.S. data 0, 1, and 2 for differential driving, and the original set of T.M.D.S. clocks for differential driving, respectively. As a result, the serial optical digital signals transmitted from the host device H through the optical extension cables 4-1 to 4-4 are inversely transformed into the original sets of T.M.D.S. data 0, 1, and 2 for differential driving, and the original set of T.M.D.S. clocks for differential driving, respectively, by the photoelectric conversion circuit 25, and then they are sent to the interface 2. Further, stabilized power supply voltages are supplied to the four transform devices TR1, TR2, TR3, and TR4 of the attached circuit 61 of the host device H and to the four inverse transform devices RTR1, RTR2, RTR3, and RTR4 of the attached circuit 81 of the monitoring device M through regulators 17 and 27, respectively.

In order to ascertain whether the host device H and the monitoring device M are exactly connected with each other or not by use of DDC standard, a (DDC+5V) transmitting terminal of the interface 1 of the host device H and a (DDC+5V) receiving terminal of the interface 2 of the monitoring device M are directly connected with each other through a metal extension cable 5-1 based on DVI standard, and a HPD signal receiving terminal of the interface 1 of the host device H and a HPD signal transmitting terminal of the interface 2 of the monitoring device M are directly connected with each other through a metal extension cable 5-4 based on DVI standard. In addition, in order to transmit and receive DDC data and DDC clocks, a DDC clock transmitting/receiving terminal and a DDC data transmitting/receiving terminal of the interface 1 of the host device H are connected to a DDC clock transmitting/receiving terminal and a DDC data transmitting/receiving terminal of the interface 2 of the monitoring device M, respectively, through a buffer circuit 16 provided in the attached circuit 61 of the host device H, metal extension cables 5-2 and 5-3 each based on DVI standard, and a buffer circuit 26 provided in the attached circuit 81 of the monitoring device M. Further, a ground terminal of the interface 1 of the host device H and a ground terminal of the interface 2 of the monitoring device M is directly connected with each other through a metal extension cable 5-5 based on DVI standard.

As shown in FIG. 11, in a case arranged such that a video signal is digitally transmitted at high speed through the optical extension cables by use of T.M.D.S. transmission system, and that (DDC+5V) signal, DDC clock, DDC data and HPD signal all of which are low speed signals for carrying out the plug and play of a display are transmitted through the metal extension cables, an external power source or supply is naturally required to drive the electric-optic conversion circuit 15, the buffer circuit 16, and the photoelectric conversion circuit 25, the buffer circuit 26 provided in the attached circuits 61 and 81, and other attached circuits, etc. In order to ascertain whether the external power source supplies its power to these circuits without fail or not, in the prior art, a control for ascertaining whether the external power source supplies its power to the electric-optic conversion circuit 15, the buffer circuit 16, the photoelectric conversion circuit 25, the buffer circuit 26, etc. without fail is added to the control for ascertaining whether the host device H and the monitoring device M are exactly connected with each other by use of DDC standard as shown in the flow chart of FIG. 10.

FIG. 12 is a flow chart showing one example of the prior art in which the aforesaid control for ascertaining whether the external power source supplies its power to the electric-optic conversion circuit 15, the buffer circuit 16, the photoelectric conversion circuit 25, the buffer circuit 26, etc. without fail is added to the flow chart of FIG. 10. Further, the control for ascertaining whether the host device H and the monitoring device M are exactly connected with each other by use of DDC standard has been already described with reference to FIG. 10, and the explanation thereof will be omitted here.

As shown in FIG. 12, at first, an external power source is caused to turn on in a step 3, and in the next decision step 31, it is determined whether the external power source has been turned on or not. In case the external power source has been turned on, the decision step 31 outputs "Yes" signal, and the process proceeds to a step 32. In the step 32, a predetermined power from the external power source is supplied to the electric-optic conversion circuit 15, the buffer circuit 16, the photoelectric conversion circuit 25, the buffer circuit 26, etc. In this manner, it is ascertained that the external power source is supplying its power correctly to these circuits.

Though the prior art ascertains that the external power source is supplying its power correctly to the electric-optic conversion circuit 15, the buffer circuit 16, the photoelectric conversion circuit 25, the buffer circuit 26, etc. on the basis of the above-mentioned process, it is impossible to ascertain whether the host device H and the monitoring device M are exactly connected with each other through the optical extension cables 4-1 to 4-4 each based on DVI standard. If the host device H should not be connected exactly to the monitoring device M through the optical extension cables 4-1 to 4-4, even the external power source is caused to turn on thereby to supply its power to the electric-optic conversion circuit 15, the buffer circuit 16, the photoelectric conversion circuit 25, the buffer circuit 26, etc., any video signal is not transmitted from the host device H to the monitoring device M, and hence it is impossible to display a picture or image corresponding to the video signal on the display. Accordingly, there is incurred a result that the power is wasted.

Moreover, the optical extension cables 4-1 to 4-4 and the metal extension cables 5-1 to 5-5 are usually constructed as a composite cable in one body. Accordingly, if the metal extension cables 5-1 to 55 have been exactly connected, then the optical extension cables 4-1 to 4-4 would have been exactly connected without fail. For this reason, as already discussed with reference to FIG. 10, when it is ascertained that the host device H and the monitoring device M are exactly connected with each other by carrying out the process for ascertaining whether the host device H and the monitoring device M are exactly connected with each other by use of DDC standard, there occurs a drawback that the sequence for digitally transmitting a video signal is started even if the external power source does not supply its power to the electric-optic conversion circuit 15, the buffer circuit 16, the photoelectric conversion circuit 25, the buffer circuit 26, etc.

SUMMARY OF THE INVENTION

It is an object of the present invention to provide a controller arranged such that it controls to prevent any external power source for driving attached circuits and the like of a host device and a monitoring device from being turned on, if the host device and the monitoring device are not connected exactly with each other through optical extension cables each based on DVI standard.

It is another object of the present invention to provide a controller arranged such that it controls to prevent a sequence for digitally transmitting a video signal from being started even the case a host device and a monitoring device are exactly connected with each other through optical extension cables each based on DVI standard, if any external power source for driving attached circuits and the like of the host device and the monitoring device should not have been turned on.

In order to accomplish the foregoing objects, in an aspect of the present invention, there is provided a controller for a host device and a monitoring device connected on the basis of DVI standard, which comprises: a host device and a monitoring device connected with each other on the basis of DVI standard for digitally transmitting a video signal through at least one optical extension cable based on DVI standard; a (DDC+5V) signal source that is provided in the host device and generates a (DDC+5V) signal; at least one external power source that drives attached circuits of the host device and the monitoring device; a first detector part that detects whether a (DDC+5V) signal transmitted from the host device is the proper signal or not, and the external power source has been turned on or not; a (DDC+5V) signal transmitting part that transmits a (DDC+5V) signal to the monitoring device only when the proper (DDC+5V) signal is detected in the first detector part as well as the fact that the external power source has been turned on is detected; a HPD signal source that is provided in the monitoring device and generates a HPD signal as a return signal for the (DDC+5V) signal transmitted to the monitoring device from the (DDC+5V) signal transmitting part; a second detector part that detects whether a HPD signal generated from the HPD signal source is the proper signal or not; a power supplying part that supplies the power of the external power source to the attached circuits of the host device and the monitoring device in response to a control signal outputted from the second detector part when the HPD signal is the proper signal; a third detector part that detects the power supply operation of the power supplying part; and a HPD signal transmitting part that transmits the HPD signal to the host device in response to a control signal outputted from the third detector part when the power supply operation of the power supplying part is detected by the third detector part.

Either one of the attached circuit of the host device or the attached circuit of the monitoring device may have an external power source connected thereto, or each of the attached circuits of the host device and the monitoring device may have an external power source connected thereto.

In addition, the third detector part operates, when it detects the power supply operation of the power supplying part, to output a control signal to the HPD signal transmitting part as well as to cause the external power source to supply its power to the attached circuits of the host device and the monitoring device.

According to the construction as mentioned above, only when the proper (DDC+5V) signal is generated from the host device and the external power source or sources has been turned on, the (DDC+5V) signal is transmitted from the host device to the monitoring device. Also, only when the HPD signal generated from the monitoring device is determined to be the proper HPD signal, the power of the external power source or the powers of the external power sources is supplied to the attached circuits (the electric-optic conversion circuit, the photoelectric conversion circuit, the buffer circuits, etc.) of the host device and the monitoring device, and the HPD signal is transmitted from the monitoring device to the host device. Accordingly, if the host device and the monitoring device are not connected exactly with each other through the optical extension cable, it is prevented that the power or powers of the external power source or sources is supplied to the attached circuits of the host device and the monitoring device. Moreover, even if the host device and the monitoring device are exactly connected with each other through the optical extension cable and at least one metal extension cable, it is inhibited that the (DDC+5V) signal is transmitted to the monitoring device as well as the HPD signal is transmitted to the host device unless the external power source or sources has been turned on.

DETAILED DESCRIPTION OF THE PREFERRED EMBODIMENTS

The preferred embodiments of the present invention will now be described in detail with reference to FIGS. 1 to 9. The present invention may, however, be embodied in many different forms and should not be construed as limited to the embodiments set forth hereinafter; rather, the embodiments are provided so that this disclosure will be thorough and complete, and will fully convey the scope of the invention to those skilled in the art.

Figure 2:
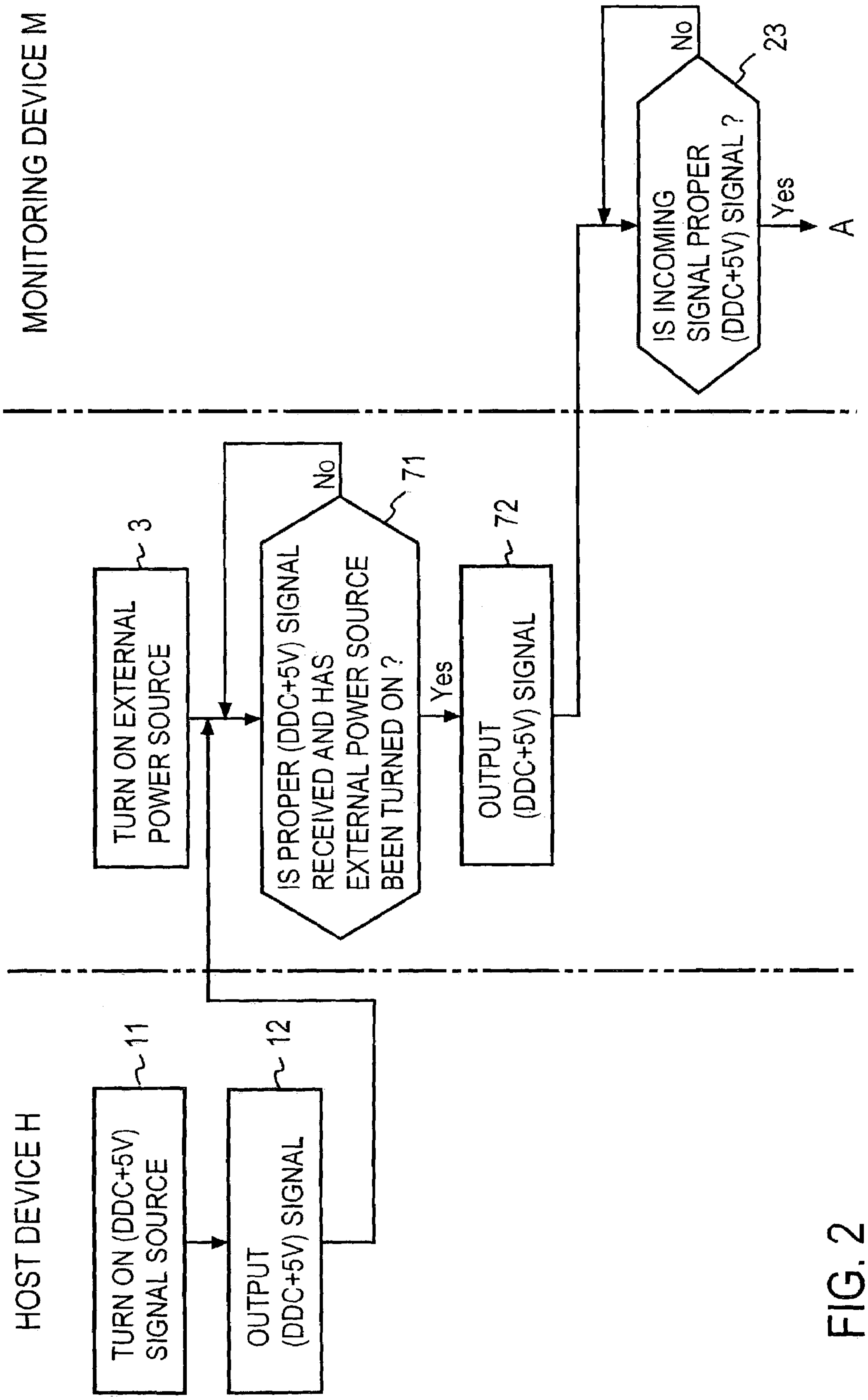
FIG. 2 is a flow chart for explaining the operation of the controller shown in FIG. 1.
Figure 3:
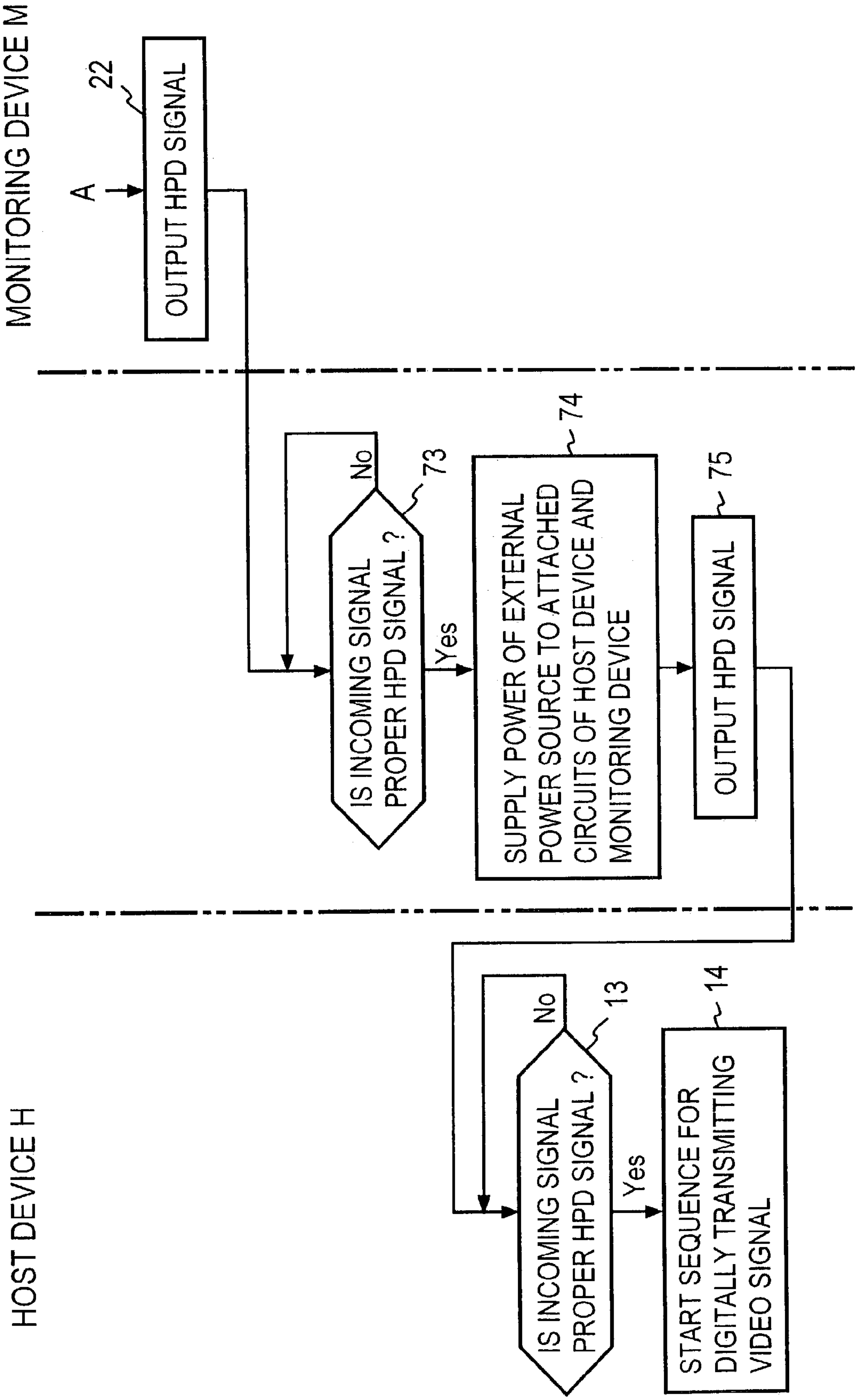
FIG. 3 is a flow chart showing the continued portion of the flow chart shown in FIG. 2.
Figure 10:
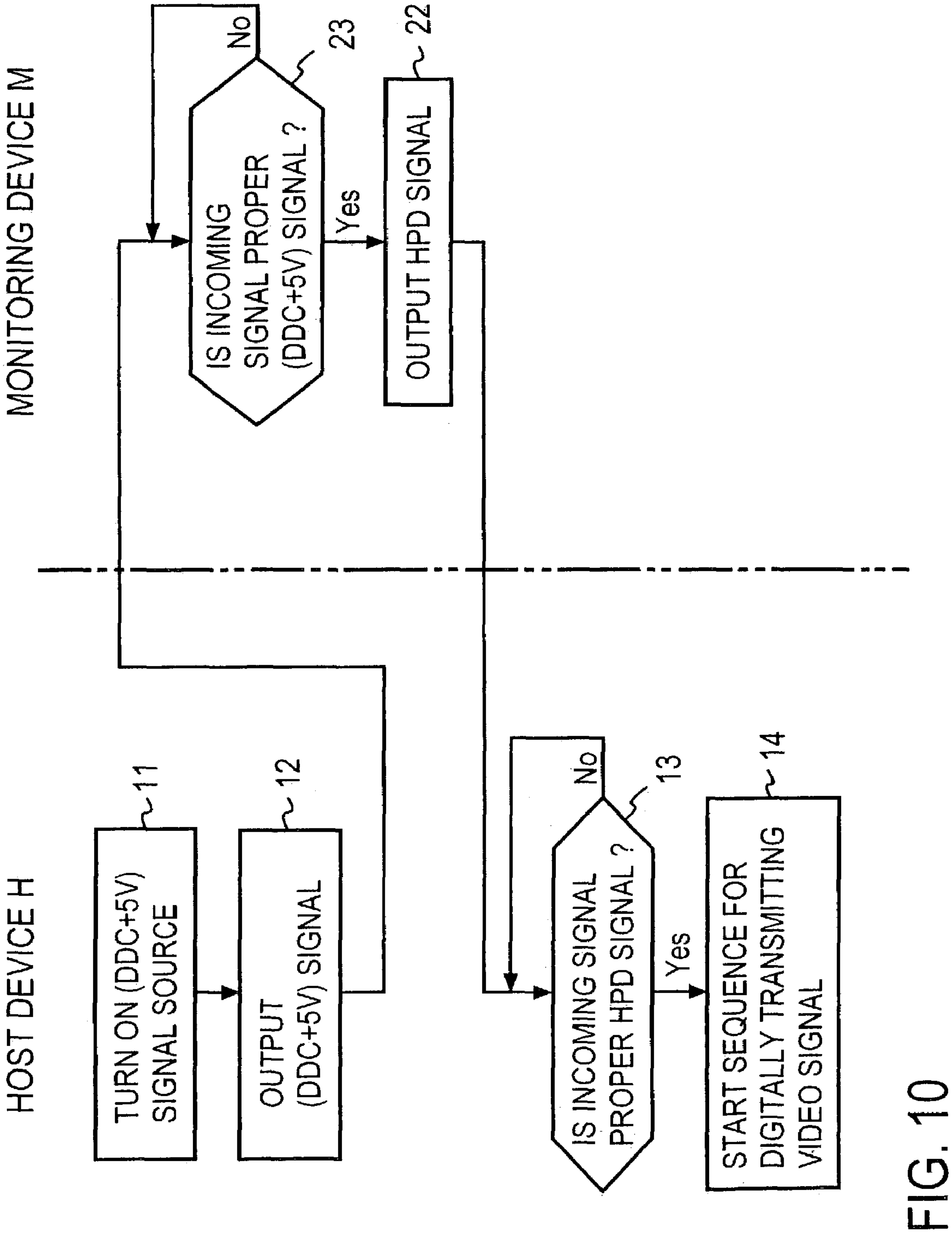
FIG. 10 is a flow chart for explaining the operation of an example of the prior art controller for a host device and a monitoring device connected with each other on the basis of DVI standard.

First, a first embodiment according to the present invention will be described with reference to FIGS. 1 to 3. Further, in FIGS. 1 to 3, portions, elements or members shown therein corresponding to those shown in FIGS. 10 to 12 will be denoted by the same characters or numerals attached thereto, and the explanation thereof will be omitted unless necessary.

Figure 1:
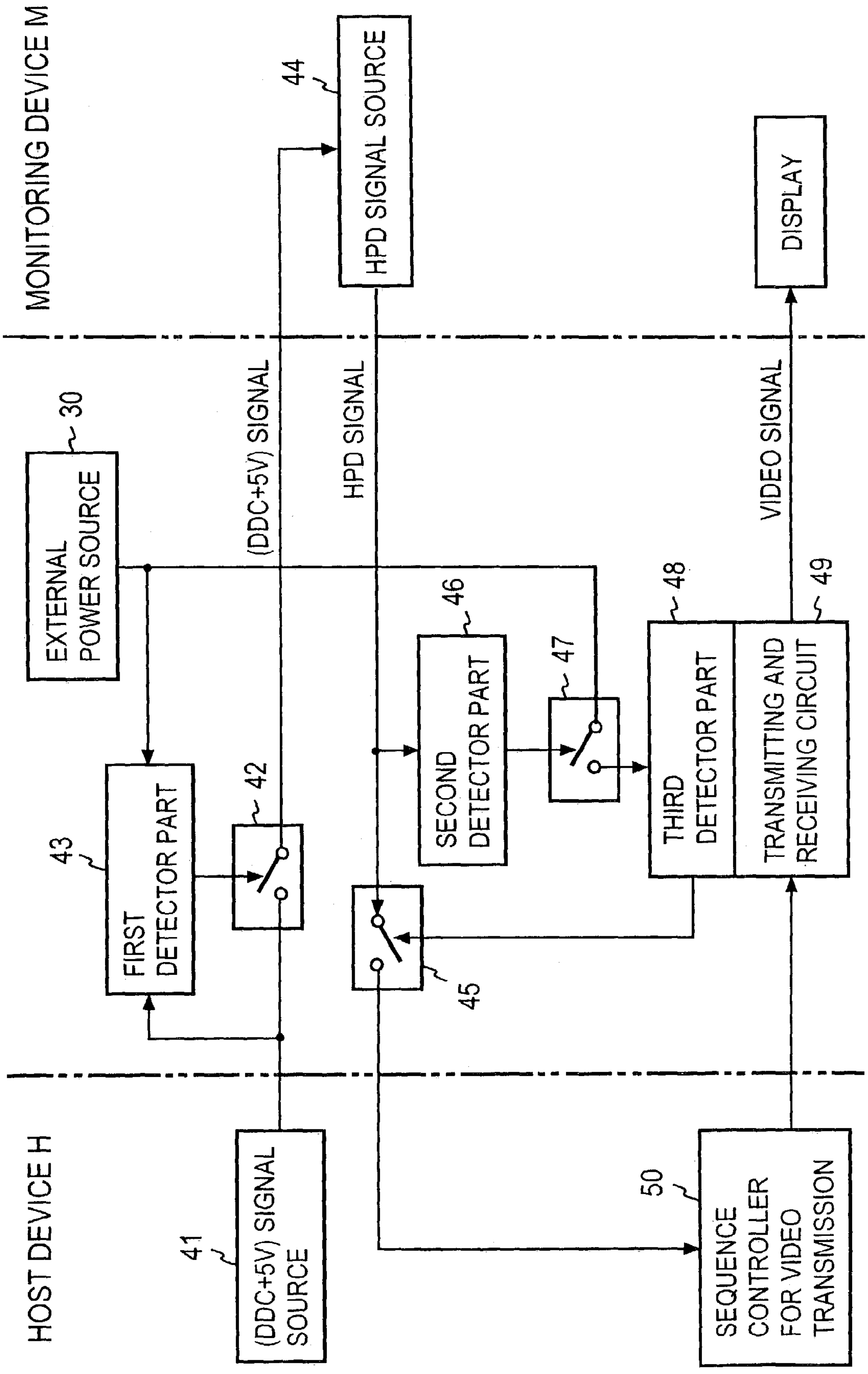
FIG. 1 is a block diagram showing a first embodiment of the controller for a host device and a monitoring device connected with each other on the basis of DVI standard according to the present invention.

FIG. 1 is a block diagram showing a first embodiment of the controller for a host device and a monitoring device connected with each other on the basis of DVI standard according to the present invention. In this embodiment, the host device H and the monitoring device M are also configured such that they are connected with each other through a composite cable in one body formed by unifying optical extension cables each based on DVI standard and metal extension cables each based on DVI standard, a video signal is digitally transmitted at high speed through the optical extension cables by use of T.M.D.S. transmission system, and (DDC+5V) signal, DDC clock, DDC data and HPD signal all of which are low speed signals for carrying out the plug and play of a display are transmitted through the metal extension cables.

Figure 11:
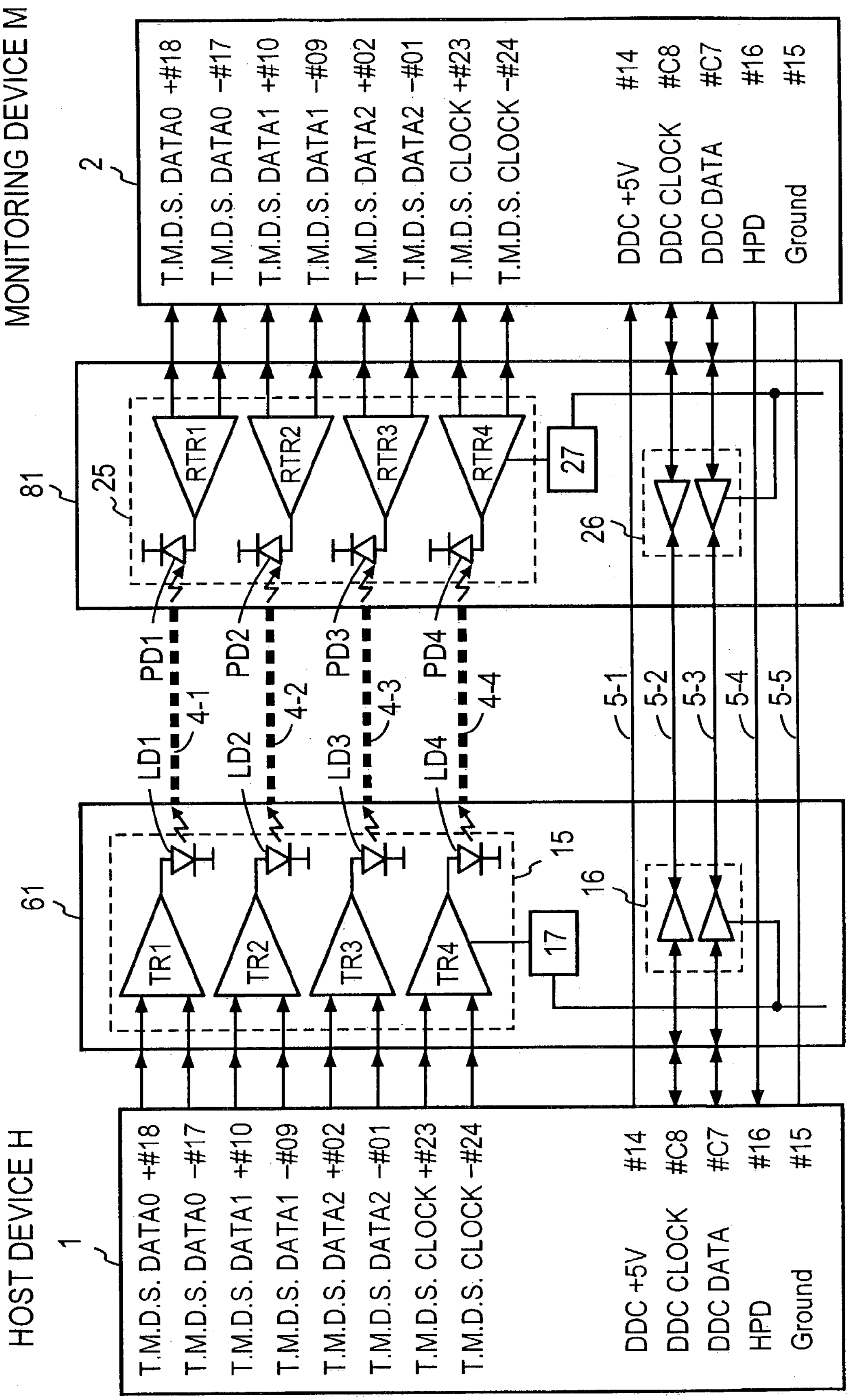
FIG. 11 is a connection diagram showing another example of the prior art controller for a host device and a monitoring device connected with each other on the basis of DVI standard.
Figure 12:
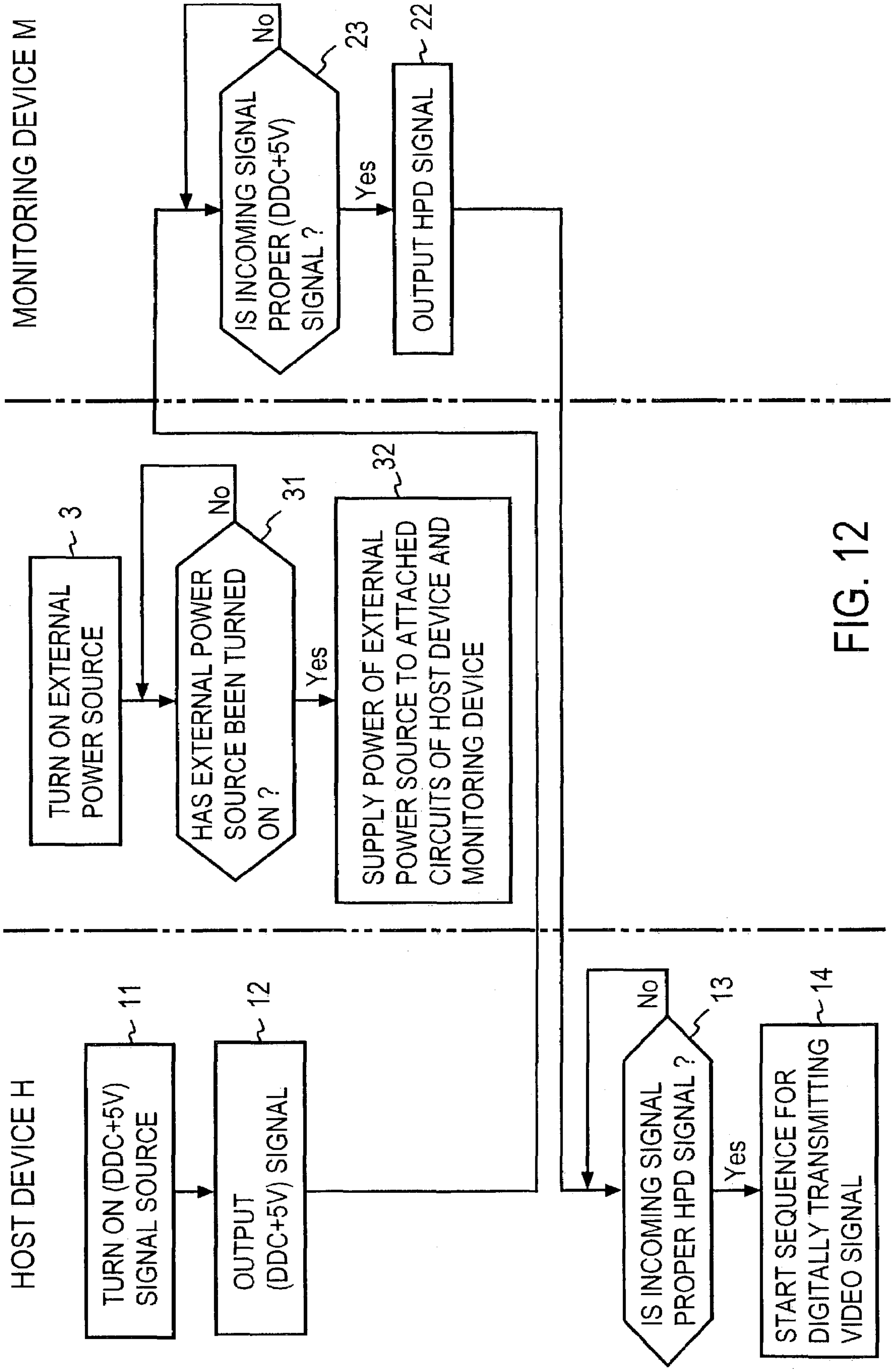
FIG. 12 is a flow chart for explaining the operation of the prior art controller shown in FIG. 11.

More specifically, the host device H and the monitoring device M are provided with their interfaces and attached circuits having the same configurations as those of the prior art shown in FIG. 11, respectively, and the electric-optic conversion circuit of the attached circuit of the host device H and the photoelectric conversion circuit of the attached circuit of the monitoring device M are connected with each other through a predetermined number of the optical extension cables each based on DVI standard. In addition, in order to ascertain whether the host device H and the monitoring device M are exactly connected with each other or not by use of DDC standard, the (DDC+5V) transmitting terminal of the interface of the host device H and the (DDC+5V) receiving terminal of the interface of the monitoring device M are directly connected with each other through a metal extension cable based on DVI standard, and the HPD signal receiving terminal of the interface of the host device H and the HPD signal transmitting terminal of the interface of the monitoring device M are directly connected with each other through a metal extension cable based on DVI standard. In order to transmit and receive DDC data and DDC clocks, the DDC clock transmitting/receiving terminal and the DDC data transmitting/receiving terminal of the interface of the host device H are connected to the DDC clock transmitting/receiving terminal and the DDC data transmitting/receiving terminal of the interface of the monitoring device M, respectively, through the buffer circuit provided in the attached circuit of the host device H, metal extension cables each based on DVI standard, and the buffer circuit provided in the attached circuit of the monitoring device M.

In this embodiment, the host device H has a (DDC+5V) signal transmitting part 42 illustrated in FIG. 1 as an ON/OFF switch and a first detector part 43 for controlling the (DDC+5V) signal transmitting part 42 provided therein. When a (DDC+5V) signal source 41 provided in the host device H is turned on, a (DDC+5V) signal is supplied to these (DDC+5V) signal transmitting part 42 and first detector part 43. On the other hand, the monitoring device M has a HPD signal transmitting part 45 illustrated in FIG. 1 as an ON/OFF switch and a second detector part 46 provided therein. When a HPD signal source 44 provided in the monitoring device M is turned on, a HPD signal is supplied to these HPD signal transmitting part 45 and second detector part 46.

The first detector part 43 of the host device H generates a control signal only when the (DDC+5V) signal is supplied thereto from the (DDC+5V) signal source 41 and a predetermined power is supplied thereto from an external power source or supply 30 for driving the attached circuits and the like of the host device H and the monitoring devices M, and the control signal is applied to the (DDC+5V) signal transmitting part 42. The (DDC+5V) signal transmitting part 42 transmits, when it receives the control signal, the (DDC+5V) signal already supplied to the transmitting part 42 to the monitoring device M. In other words, the ON/OFF switch of the (DDC+5V) signal transmitting part 42 is turned on in response to the control signal supplied from the first detector part 43, and the (DDC+5V) signal is sent to the metal extension cable after having passed through the (DDC+5V) signal transmitting part 42. As a result, the (DDC+5V) signal is transmitted to the monitoring device M. Accordingly, the (DDC+5V) signal is not transmitted from the host device H to the monitoring device M unless the external power source 30 has been turned on.

The monitoring device M causes the HPD signal source 44, when it receives the (DDC+5V) signal from the host device H, to generate a HPD signal which in turn is supplied to the HPD signal transmitting part 45 and the second detector part 46. The second detector part 46 supplies, when it receives the HPD signal, a control signal which in turn is supplied to an external power supplying part 47 illustrated in FIG. 1 as an ON/OFF switch. If the external power source 30 has been turned on, a predetermined power is supplied to the external power supplying part 47. Therefore, the external power supplying part 47 supplies, when it receives the control signal from the second detector part 46, the predetermined power already supplied thereto from the external power source 30 to a third detector part 48 provided in the monitoring device M.

The third detector part 48 supplies, when the predetermined power is supplied thereto from the external power supplying part 47, a control signal to the HPD signal transmitting part 45 as well as supplies the power from the external power source 30 to a transmitting and receiving circuit 49 including the attached circuits (the electric-optic conversion circuit, the photoelectric conversion circuit, the buffer circuits, etc.) of the host device H and the monitoring device M, thereby to drive these circuits. The HPD signal transmitting part 45 transmits, when it receives the control signal from the third detector part 48, the HPD signal already supplied to the transmitting part 45 to the host device H. In other words, the ON/OFF switch of the HPD signal transmitting part 45 is turned on in response to the control signal supplied from the third detector part 48, and the HPD signal is sent to the metal extension cable after having passed through the HPD signal transmitting part 45. As a result, the HPD signal is transmitted to the host device H. Accordingly, the HPD signal is not transmitted from the monitoring device M to the host device H unless the external power source 30 has been turned on.

The HPD signal transmitted to the host device H from the monitoring device M is sent to a sequence controller 50 provided in the host device H, and when it is determined to be the proper HPD signal in the sequence controller 50, the sequence controller 50 starts a sequence for digitally transmitting a video signal. Consequently, the video signal is digitally transmitted from the host device H to the monitoring device M through the transmitting and receiving circuit 49, and a picture or image corresponding to the transmitted video signal is displayed on the display of the monitoring device M.

The aforementioned operation of the controller of the first embodiment will be described in further detail with referenced to flow charts shown in FIGS. 2 and 3.

First, in a step 11, the (DDC+5V) signal source 41 provided in the host device (for example, computer) H is caused to turn on, and in the next step 12, a (DDC+5V) signal is generated from the (DDC+5V) signal source 41, and the process proceeds to a decision step 71. Also, in a step 3, the external power source 30 is caused to turn on. The decision step 71 decides whether the proper (DDC+5V) signal is generated or not, and whether the external power source 30 has been turned on or not. If the proper (DDC+5V) signal is generated, but the external power source 30 still remains off, or if the external power source 30 has been turned on, but the proper (DDC+5V) signal is not generated or an improper (DDC+5V) signal is generated, the decision step 71 outputs "No" signal, and the process does not proceed to the next step 72. Only the case the proper (DDC+5V) signal is generated and the external power source 30 has been turned on, the decision step 71 outputs "Yes" signal, and the process proceeds to the next step 72. In this step 72, the (DDC+5V) signal is transmitted from the host device H to the monitoring device M via the metal extension cable. Accordingly, only when the proper (DDC+5V) signal is generated and the external power source 30 has been turned on, the (DDC+5V) signal generated from the (DDC+5V) signal source of the host device H is transmitted to the monitoring device M.

In the monitoring device M, it is determined in a decision step 23 whether the transmitted (DDC+5V) signal is the proper (DDC+5V) signal or not. In case it is the proper (DDC+5V) signal, the decision step 23 generates "Yes" signal, and the process proceeds to a step 22 shown in FIG. 3. In the step 22, the HPD signal source 44 provided in the monitoring device M is driven to generate a HPD signal (a return signal of the (DDC+5V) signal) therefrom, and the process proceeds to the next decision step 73. The decision step 73 decides whether the generated HPD signal is the proper HPD signal or not. When the decision step 73 decides that it is the proper HPD signal, "Yes" signal is outputted from the decision step 73, and the process proceeds to a step 74. In this step 74, the power of the external power source is supplied to the attached circuits (the electric-optic conversion circuit, the photoelectric conversion circuit, the buffer circuits, etc.) of the host device H and the monitoring device M, and in the next step 75, the HPD signal is transmitted from the monitoring device M to the host device H through the metal extension cable. The HPD signal transmitted to the host device H is determined in a decision step 13 of the host device H whether it is the proper HPD signal or not. In this decision step 13, when it is determined to be the proper HPD signal, the decision step 13 outputs "Yes" signal, and in the next step 14, a sequence for digitally transmitting a video signal is started.

As is clear from the foregoing explanation, in the first embodiment of the present invention, only when the proper (DDC+5V) signal is generated from the host device H and the external power source 30 has been turned on, the (DDC+5V) signal is transmitted from the host device H to the monitoring device M. Also, only when the HPD signal generated from the monitoring device M is determined to be the proper HPD signal, the power of the external power source is supplied to the attached circuits (the electric-optic conversion circuit, the photoelectric conversion circuit, the buffer circuits, etc.) of the host device H and the monitoring device M, and the HPD signal is transmitted from the monitoring device M to the host device H. Accordingly, if the host device H and the monitoring device M are not connected exactly with each other through the optical extension cables, the power of the external power source is not supplied to the attached circuits of the host device H and the monitoring device M, which results in the elimination of a drawback that a wasteful power is consumed.

Moreover, when the host device H and the monitoring device M are exactly connected with each other through the optical extension cables and the metal extension cables, the (DDC+5V) signal is not transmitted to the monitoring device M and the HPD signal is not transmitted to the host device H unless the external power source has been turned on. Accordingly, there is eliminated a drawback that the sequence for digitally transmitting a video signal is started in the condition that the power of the external power source is not supplied to the attached circuits of the host device H and the monitoring device M.

Further, in the first embodiment, though the steps 3, 71 and 72 are carried out in the side of the host device H, these steps can be equally carried out in the side of the monitoring device M and the same functions and effects can be obtained. Also, though the steps 73, 74 and 75 are carried out in the side of the monitoring device M, these steps can be equally carried out in the side of the host device H and the same functions and effects can be obtained. Further, the external power source or supply may be connected to either the attached circuit of the host device H or the attached circuit of the monitoring device M. Or alternatively, both of the attached circuits of the host device H and the monitoring device M have their respective external power sources connected thereto.

A second embodiment of the controller for a host device and a monitoring device connected with each other on the basis of DVI standard according to the present invention will be described with reference to FIGS. 4 and 5. This second embodiment shows the case that an external power source or supply is connected to the attached circuit of the host device H.

Figure 4:
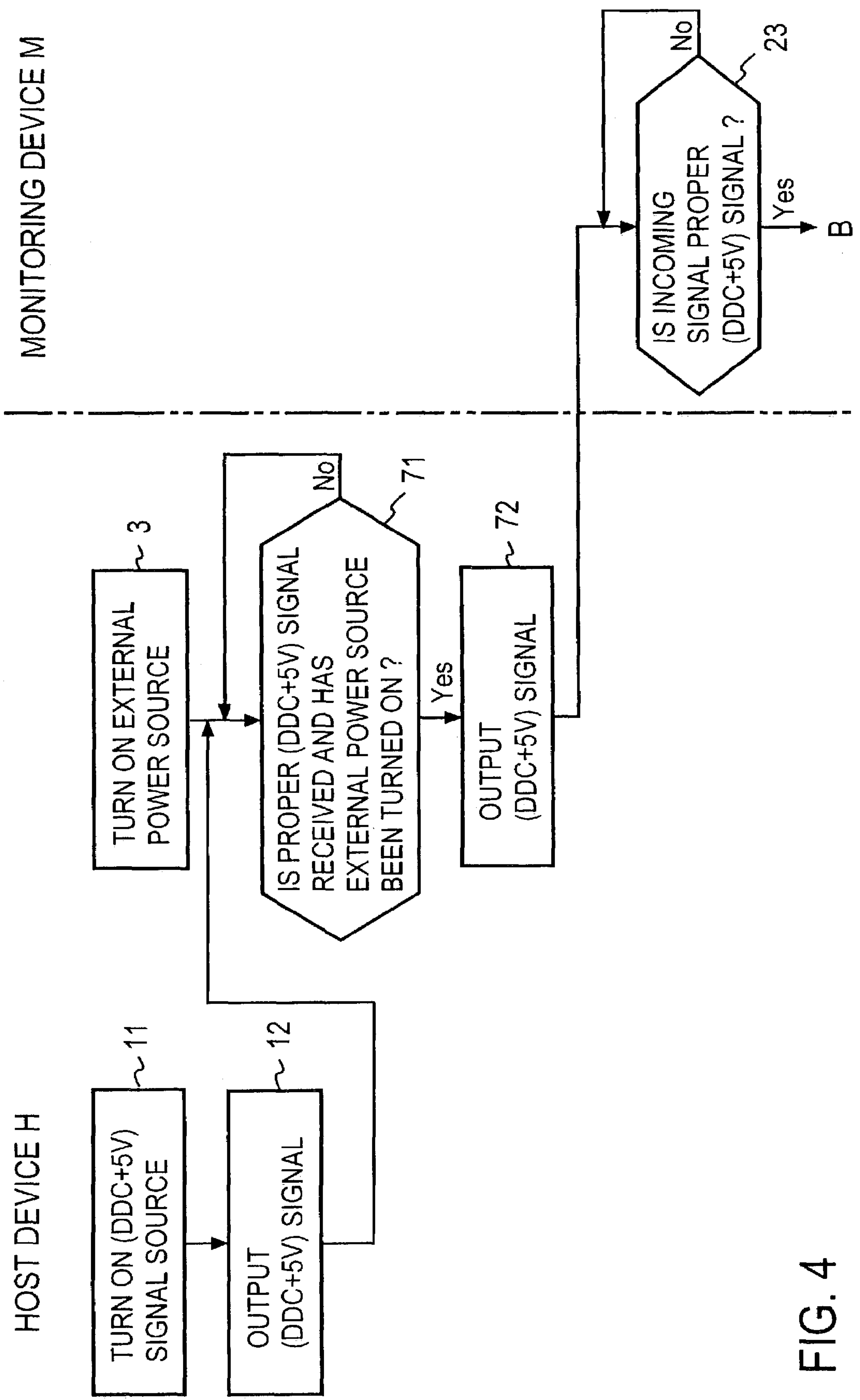
FIG. 4 is a flow chart for explaining the operation of a second embodiment of the controller for a host device and a monitoring device connected with each other on the basis of DVI standard according to the present invention.
Figure 5:
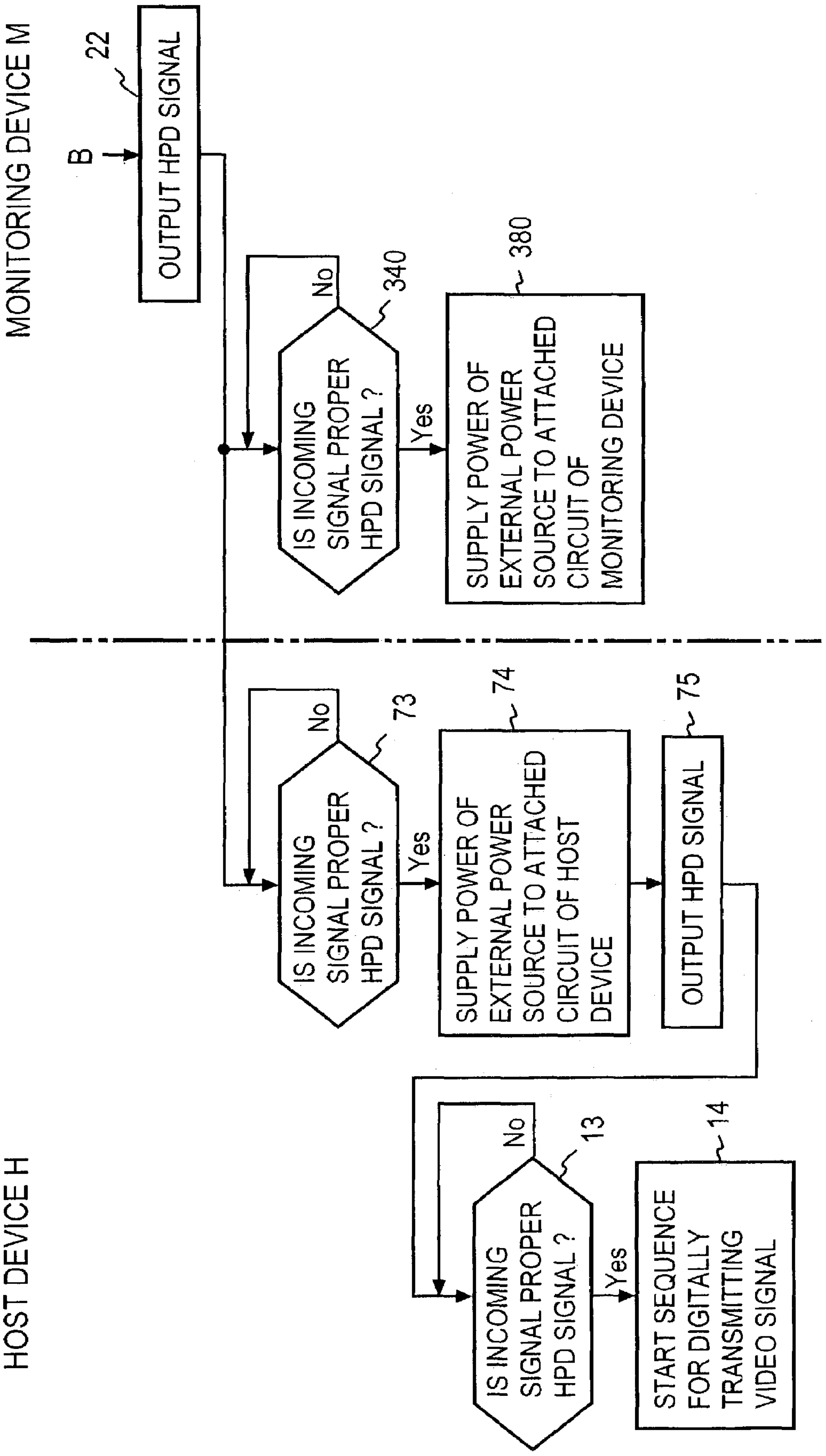
FIG. 5 is a flow chart showing the continued portion of the flow chart shown in FIG. 4.

FIGS. 4 and 5 are flow charts for explaining the operation of the second embodiment. First, as shown in FIG. 4, in a step 11 in the side of the host device H, a (DDC+5V) signal source provided in the host device (for example, computer) H is caused to turn on, and in the next step 12, a (DDC+5V) signal is generated from the (DDC+5V) signal source and the process proceeds to a decision step 71. Also, in a step 3, an external power source connected to the attached circuit of the host device H is caused to turn on. The decision step 71 decides whether the generated (DDC+5V) signal is the proper (DDC+5V) signal or not, and whether the external power source has been turned on or not. If the proper (DDC+5V) signal is generated, but the external power source still remains off, or if the external power source has been turned on, but the proper (DDC+5V) signal is not generated or an improper (DDC+5V) signal is generated, the decision step 71 outputs "No" signal, and the process does not proceed to the next step 72. Only the case the proper (DDC+5V) signal is generated and the external power source has been turned on, the decision step 71 outputs "Yes" signal, and the process proceeds to the next step 72. In this step 72, the (DDC+5V) signal is outputted to the metal extension cable from the host device H, and then is transmitted to the monitoring device M. Accordingly, only when the proper (DDC+5V) signal is generated and the external power source has been turned on, the (DDC+5V) signal generated from the (DDC+5V) signal source of the host device H is transmitted to the monitoring device M.

In the monitoring device M, it is determined in its decision step 23 whether the transmitted (DDC+5V) signal is the proper (DDC+5V) signal or not. In case it is the proper (DDC+5V) signal, the decision step 23 generates "Yes" signal, and the process proceeds to a step 22 shown in FIG. 5. The process as described until now is the same as that of the first embodiment.

In the step 22, a HPD signal source provided in the monitoring device M is driven to generate a HPD signal (a return signal of the (DDC+5V) signal) therefrom, and the process proceeds to the next decision step 340 and a decision step 73 in the side of the host device H. At first, the decision step 340 in the side of the monitoring device M decides whether the generated HPD signal is the proper HPD signal or not. When the decision step 340 decides that it is the proper HPD signal, "Yes" signal is outputted from the decision step 340, and the process proceeds to a step 380. In this step 380, the power of the external power source connected to the attached circuit of the host device H is supplied to the attached circuit (the photoelectric conversion circuit, the buffer circuit, etc.) of the monitoring device M. Here, the process in the side of the monitoring device M is completed.

On the other hand, the decision step 73 in the side of the host device H decides whether the HPD signal transmitted via the metal extension cable is the proper HPD signal or not. When the decision step 73 decides that it is the proper HPD signal, "Yes" signal is outputted from the decision step 73, and the process proceeds to a step 74. In this step 74, the power of the external power source connected to the attached circuit of the host device H is supplied to the attached circuit (the electric-optic conversion circuit, the buffer circuit, etc.) of the host device H, and in the next step 75, the HPD signal is outputted to the metal extension cable from the monitoring device M, and then is transmitted to the host device H. In the next decision step 13, whether the transmitted HPD signal is the proper HPD signal or not is determined. When it is determined to be the proper HPD signal, the decision step 13 outputs "Yes" signal, and in the next step 14, a sequence for digitally transmitting a video signal is started.

As is obvious from the foregoing explanation, in the second embodiment of the present invention, too, only when the proper (DDC+5V) signal is generated from the host device H and the external power source has been turned on, the (DDC+5V) signal is transmitted from the host device H to the monitoring device M. Also, only when the HPD signal generated from the monitoring device M is determined to be the proper HPD signal, the power of the external power source is supplied to the attached circuits (the electric-optic conversion circuit, the photoelectric conversion circuit, the buffer circuits, etc.) of the host device H and the monitoring device M, and the HPD signal is transmitted from the monitoring device M to the host device H. Accordingly, if the host device H and the monitoring device M are not connected exactly with each other through the optical extension cables, the power of the external power source is not supplied to the attached circuits of the host device H and the monitoring device M, and hence a disadvantage that the power is wasted does not occur.

Moreover, even if the host device H and the monitoring device M are exactly connected with each other through the optical extension cables and the metal extension cables, the (DDC+5V) signal is not transmitted to the monitoring device M and the HPD signal is not transmitted to the host device H unless the external power source has been turned on. Accordingly, there does not occur a drawback that the sequence for digitally transmitting a video signal is started in the condition that the power of the external power source is not supplied to the attached circuits of the host device H and the monitoring device M.

A third embodiment of the controller for a host device and a monitoring device connected with each other on the basis of DVI standard according to the present invention will be described with reference to FIGS. 6 and 7. This third embodiment shows the case that an external power source or supply is connected to the attached circuit of the monitoring device M.

Figure 6:
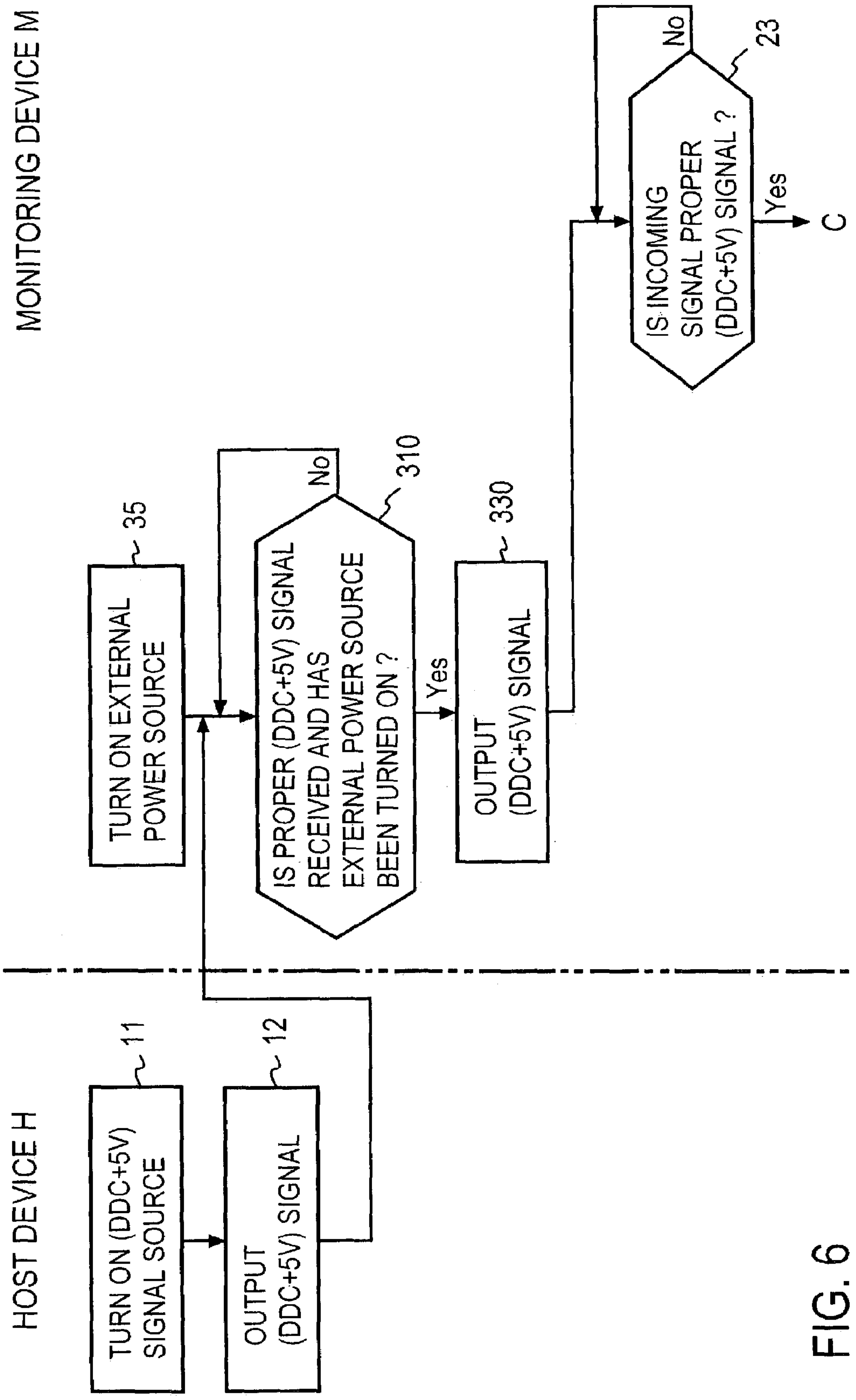
FIG. 6 is a flow chart for explaining the operation of a third embodiment of the controller for a host device and a monitoring device connected with each other on the basis of DVI standard according to the present invention.
Figure 7:
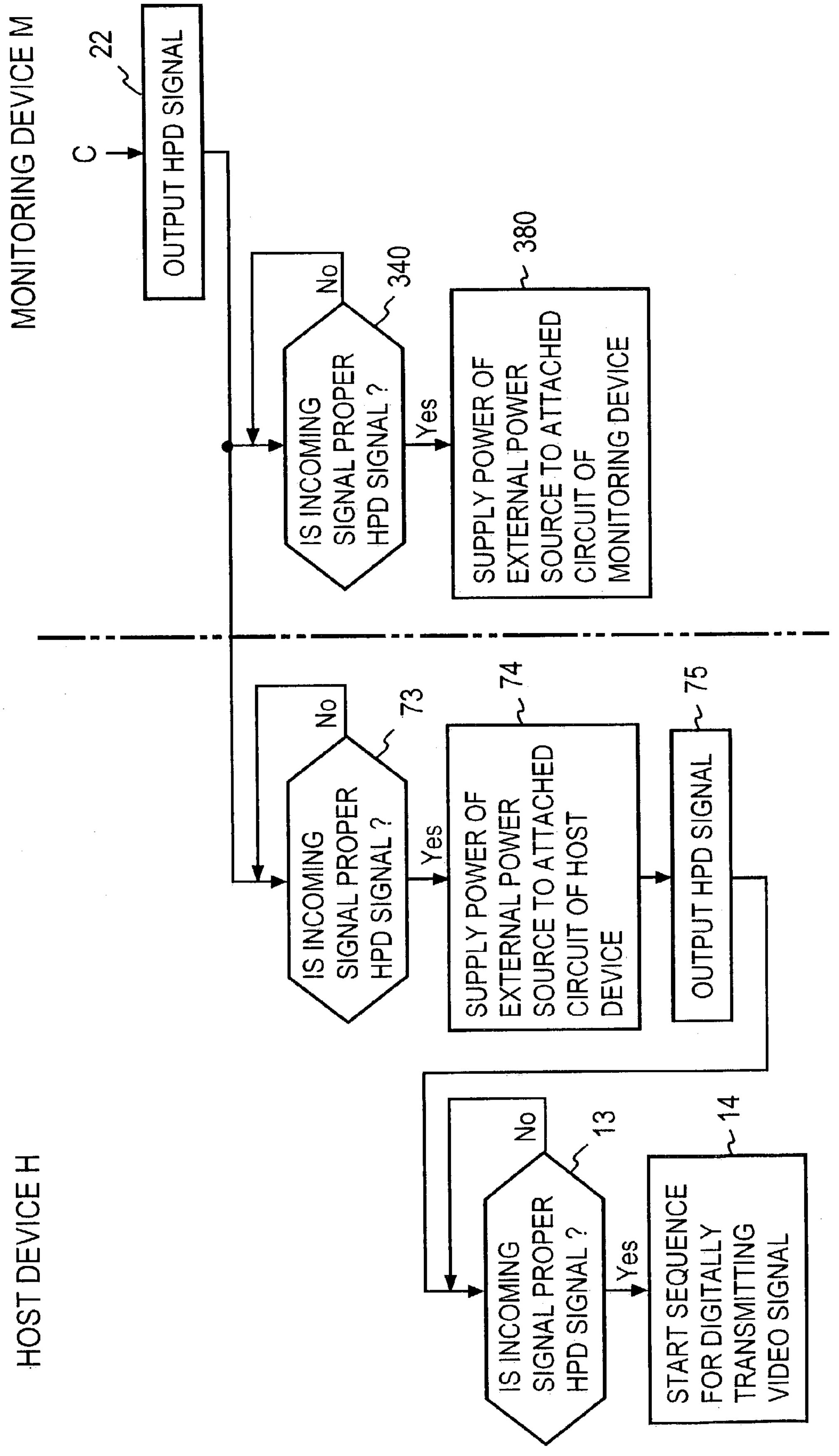
FIG. 7 is a flow chart showing the continued portion of the flow chart shown in FIG. 6.

FIGS. 6 and 7 are flow charts for explaining the operation of the third embodiment. First, as shown in FIG. 6, in a step 11 in the side of the host device H, a (DDC+5V) signal source provided in the host device (for example, computer) H is caused to turn on, and in the next step 12, a (DDC+5V) signal is generated from the (DDC+5V) signal source, and the process proceeds to a decision step 310 in the side of the monitoring device M. Also, in a step 35 in the side of the monitoring device M, an external power source connected to the attached circuit of the monitoring device M is caused to turn on.

The decision step 310 decides whether the (DDC+5V) signal transmitted from the host device H through the metal extension cable to the monitoring device M is the proper (DDC+5V) signal or not, and whether the external power source has been turned on or not. If the proper (DDC+5V) signal is received, but the external power source still remains off, or if the external power source has been turned on, but the proper (DDC+5V) signal is not received or an improper (DDC+5V) signal is received, the decision step 310 outputs "No" signal, and the process does not proceed to the next step 330. Only the case the proper (DDC+5V) signal is received and the external power source has been turned on, the decision step 310 outputs "Yes" signal, and the process proceeds to the next step 330. In this step 330, the (DDC+5V) signal is transmitted from the host device H through the metal extension cable to the monitoring device M. Accordingly, only when the proper (DDC+5V) signal is received and the external power source has been turned on, the (DDC+5V) signal generated from the (DDC+5V) signal source of the host device H is transmitted to the monitoring device M.

When the proper (DDC+5V) signal is transmitted to the monitoring device M, it is determined in a decision step 23 whether the transmitted (DDC+5V) signal is the proper (DDC+5V) signal or not. If the transmitted (DDC+5V) signal is the proper (DDC+5V) signal, the decision step 23 generates "Yes" signal, and the process proceeds to a step 22 shown in FIG. 7. In the step 22, a HPD signal source provided in the monitoring device M is driven to generate a HPD signal (a return signal of the (DDC+5V) signal) therefrom, and the process proceeds to the next decision step 340 and a decision step 73 in the side of the host device H.

At first, in the decision step 340 in the side of the monitoring device M, it is decided whether the generated HPD signal is the proper HPD signal or not. When the decision step 340 decides that it is the proper HPD signal, "Yes" signal is outputted from the decision step 340, and the process proceeds to a step 380. In this step 380, the power of the external power source connected to the attached circuit of the monitoring device M is supplied to the attached circuit (the photoelectric conversion circuit, the buffer circuit, etc.) of the monitoring device M. Here, the process in the side of the monitoring device M is completed.

On the other hand, the decision step 73 in the side of the host device H decides whether the HPD signal transmitted through the metal extension cable is the proper HPD signal or not. When the decision step 73 decides that it is the proper HPD signal, "Yes" signal is outputted from the decision step 73, and the process proceeds to a step 74. In this step 74, the power of the external power source connected to the attached circuit of the monitoring device M is supplied to the attached circuit (the electric-optic conversion circuit, the buffer circuit, etc.) of the host device H, and in the next step 75, the HPD signal is transmitted from the monitoring device M through the metal extension cable to the host device H. In the next decision step 13, it is decided whether the transmitted HPD signal is the proper HPD signal or not. When it is determined to be the proper HPD signal, "Yes" signal is outputted from the decision step 13, and in the next step 14, a sequence for digitally transmitting a video signal is started.

As is apparent from the foregoing explanation, in the third embodiment of the present invention, too, only when the proper (DDC+5V) signal is generated from the host device H and the external power source has been turned on, the (DDC+5V) signal is transmitted from the host device H to the monitoring device M. Also, only when the HPD signal generated from the monitoring device M is determined to be the proper HPD signal, the power of the external power source is supplied to the attached circuits (the electric-optic conversion circuit, the photoelectric conversion circuit, the buffer circuits, etc.) of the host device H and the monitoring device M, and the HPD signal is transmitted from the monitoring device M to the host device H. Accordingly, if the host device H and the monitoring device M are not connected exactly with each other through the optical extension cables, the power of the external power source is not supplied to the attached circuits of the host device H and the monitoring device M, and hence a shortcoming that a wasteful power is consumed does not occur.

Moreover, even if the host device H and the monitoring device M are exactly connected with each other through the optical extension cables and the metal extension cables, the (DDC+5V) signal is not transmitted to the monitoring device M as well as the HPD signal is not transmitted to the host device H unless the external power source has been turned on. Accordingly, there does not occur a drawback that the sequence for digitally transmitting a video signal is started in the condition that the power of the external power source is not supplied to the attached circuits of the host device H and the monitoring device M.

A fourth embodiment of the controller for a host device and a monitoring device connected with each other on the basis of DVI standard according to the present invention will be described with reference to FIGS. 8 and 9. This fourth embodiment shows the case that an external power source or supply is connected to the attached circuit of the host device H and another external power source or supply is connected to the attached circuit of the monitoring device M.

Figure 8:
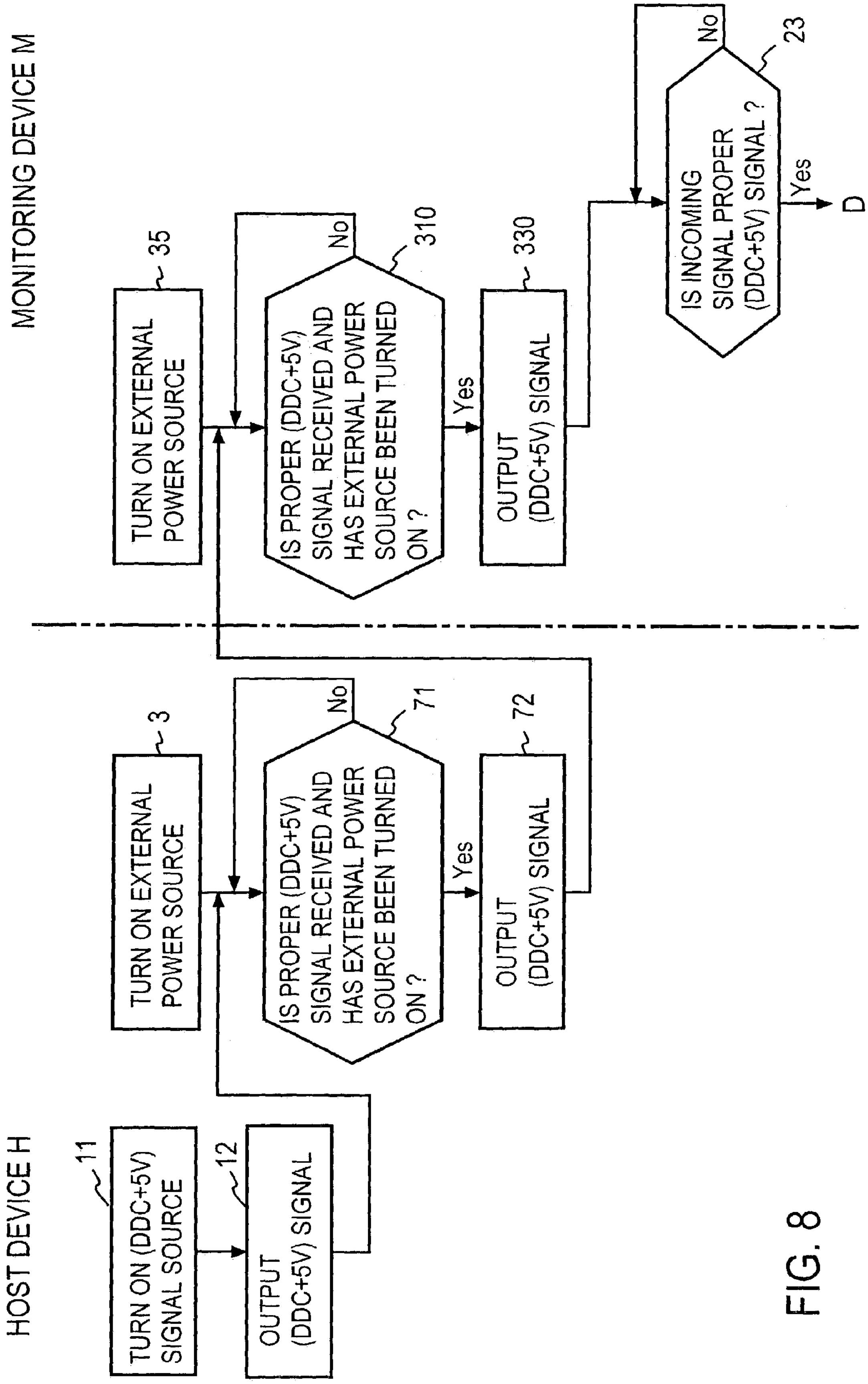
FIG. 8 is a flow chart for explaining the operation of a fourth embodiment of the controller for a host device and a monitoring device connected with each other on the basis of DVI standard according to the present invention.
Figure 9:
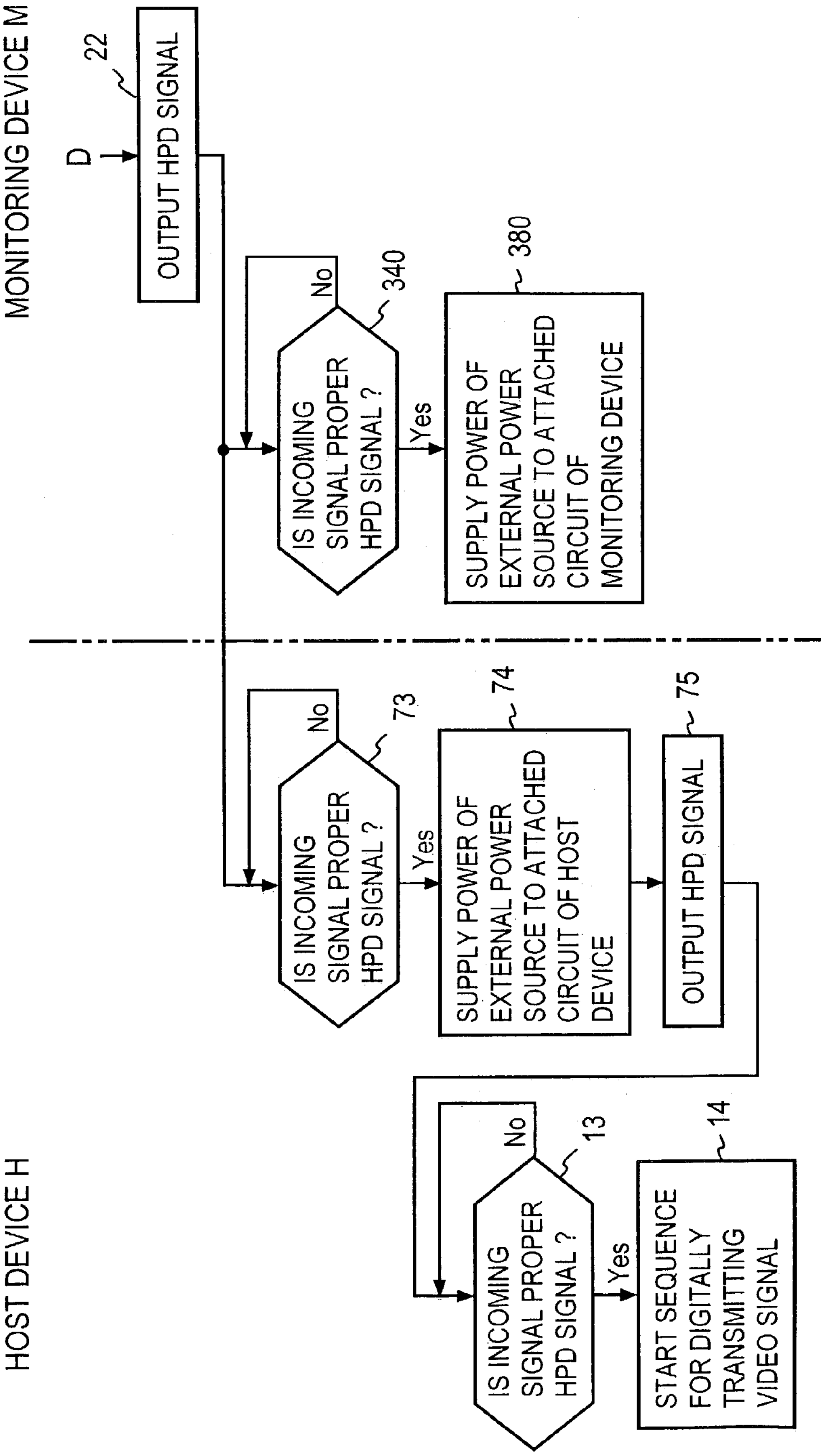
FIG. 9 is a flow chart showing the continued portion of the flow chart shown in FIG. 8.

FIGS. 8 and 9 are flow charts for explaining the operation of the fourth embodiment. First, as shown in FIG. 8, in a step 11 in the side of the host device H, a (DDC+5V) signal source provided in the host device (for example, computer) H is caused to turn on, and in the next step 12, a (DDC+5V) signal is generated from the (DDC+5V) signal source, and the process proceeds to a decision step 71. Also, in a step 3, an external power source connected to the attached circuit of the host device H is caused to turn on.

The decision step 71 determines whether the (DDC+5V) signal generated from the host device H is the proper (DDC+5V) signal or not, and whether the external power source connected to the attached circuit of the host device H has been turned on or not. If the proper (DDC+5V) signal is generated, but the external power source still remains off, or if the external power source has been turned on, but the proper (DDC+5V) signal is not generated or an improper (DDC+5V) signal is generated, the decision step 71 outputs "No" signal, and the process does not proceed to the next step 72. Only the case the proper (DDC+5V) signal is generated and the external power source has been turned on, the decision step 71 outputs "Yes" signal, and the process proceeds to the next step 72. In this step 72, the (DDC+5V) signal is transmitted from the host device H through the metal extension cable to the monitoring device M. Accordingly, only when the proper (DDC+5V) signal is generated and the external power source connected to the attached circuit of the host device H has been turned on, the (DDC+5V) signal generated from the (DDC+5V) signal source of the host device H is transmitted to the monitoring device M.

On the other hand, in the side of the monitoring device M, in a step 35, an external power source connected to the attached circuit of the monitoring device M is caused to turn on, and the process proceeds to the next decision step 310. The decision step 310 decides whether the (DDC+5V) signal transmitted from the host device H through the metal extension cable to the monitoring device M is the proper (DDC+5V) signal or not, and whether the external power source connected to the attached circuit of the monitoring device M has been turned on or not. If the proper (DDC+5V) signal is received, but the external power source still remains off, or if the external power source has been turned on, but the proper (DDC+5V) signal is not received or an improper (DDC+5V) signal is received, the decision step 310 outputs "No" signal, and the process does not proceed to the next step 330. Only the case the proper (DDC+5V) signal is received and the external power source connected to the attached circuit of the monitoring device M has been turned on, the decision step 310 outputs "Yes" signal, and the process proceeds to the next step 330. In this step 330, the (DDC+5V) signal is transmitted from the host device H through the metal extension cable to the monitoring device M. Accordingly, only when the proper (DDC+5V) signal is received and the external power source connected to the attached circuit of the monitoring device M has been turned on, the (DDC+5V) signal generated from the (DDC+5V) signal source of the host device H is transmitted to the monitoring device M.

When the proper (DDC+5V) signal is transmitted to the monitoring device M, it is determined in a decision step 23 whether the transmitted (DDC+5V) signal is the proper (DDC+5V) signal or not. In case the transmitted (DDC+5V) signal is the proper (DDC+5V) signal, the decision step 23 generates “Yes” signal, and the process proceeds to a step 22 shown in FIG. 9. In the step 22, a HPD signal source provided in the monitoring device M is driven to generate a HPD signal (a return signal of the (DDC+5V) signal) therefrom, and the process proceeds to the next decision step 340 and a decision step 73 in the side of the host device H.

At first, in the decision step 340 in the side of the monitoring device M, it is decided whether the generated HPD signal is the proper HPD signal or not. When the decision step 340 decides that it is the proper HPD signal, “Yes” signal is outputted from the decision step 340, and the process proceeds to a step 380. In this step 380, the power of the external power source connected to the attached circuit of the monitoring device M is supplied to the attached circuit (the photoelectric conversion circuit, the buffer circuit, etc.) of the monitoring device M. Here, the process in the side of the monitoring device M is completed.

On the other hand, the decision step 73 in the side of the host device H decides whether the HPD signal transmitted through the metal extension cable is the proper HPD signal or not. When the decision step 73 decides that it is the proper HPD signal, “Yes” signal is outputted from the decision step 73, and the process proceeds to a step 74. In this step 74, the power of the external power source connected to the attached circuit of the host device H is supplied to the attached circuit (the electric-optic conversion circuit, the buffer circuit, etc.) of the host device H, and in the next step 75, the HPD signal is transmitted from the monitoring device M through the metal extension cable to the host device H. In the next decision step 13, it is decided whether the transmitted HPD signal is the proper HPD signal or not. When it is determined to be the proper HPD signal, “Yes” signal is outputted from the decision step 13, and in the next step 14, a sequence for digitally transmitting a video signal is started.

As is evident from the foregoing explanation, in the fourth embodiment of the present invention, only when the proper (DDC+5V) signal is generated from the host device H and both of the external power sources have been turned on, the (DDC+5V) signal is transmitted from the host device H to the monitoring device M. Also, only when the HPD signal generated from the monitoring device M is determined to be the proper HPD signal, the powers of the external power sources are supplied to the corresponding attached circuits (the electric-optic conversion circuit, the buffer circuit, etc., and the photoelectric conversion circuit, the buffer circuit, etc.) of the host device H and the monitoring device M, respectively, and the HPD signal is transmitted from the monitoring device M to the host device H. Accordingly, if the host device H and the monitoring device M are not connected exactly with each other through the optical extension cables, the powers of the external power sources are not supplied to the respective attached circuits of the host device H and the monitoring device M, and hence a disadvantage that a wasteful power is consumed does not occur.

Moreover, even if the host device H and the monitoring device M are exactly connected with each other through the optical extension cables and the metal extension cables, the (DDC+5V) signal is not transmitted to the monitoring device M as well as the HPD signal is not transmitted to the host device H unless both of the external power sources have been turned on. Accordingly, there does not occur a drawback that the sequence for digitally transmitting a video signal is started in the condition that the powers of the external power sources are not supplied to the respective attached circuits of the host device H and the monitoring device M.

As described above, according to the present invention, only when the proper (DDC+5V) signal is generated from the host device and the external power source or sources has been turned on, the (DDC+5V) signal is transmitted from the host device to the monitoring device. Also, only when the HPD signal generated from the monitoring device is determined to be the proper HPD signal, the power of the external power source or the powers of the external power sources is supplied to the attached circuits (the electric-optic conversion circuit, the photoelectric conversion circuit, the buffer circuits, etc.) of the host device and the monitoring device, and the HPD signal is transmitted from the monitoring device to the host device. Accordingly, if the host device and the monitoring device are not connected exactly with each other through the optical extension cables, the power or powers of the external power source or sources is not supplied to the attached circuits of the host device and the monitoring device, and hence consumption of a wasteful power is prevented.

In addition, even if the host device and the monitoring device are exactly connected with each other through the optical extension cables and the metal extension cables, the (DDC+5V) signal is not transmitted to the monitoring device as well as the HPD signal is not transmitted to the host device unless the external power source or sources has been turned on. Accordingly, there is obtained an advantage that the sequence for digitally transmitting a video signal cannot be started in the condition that the power or powers of the external power source or sources is not supplied to the attached circuits of the host device and the monitoring device.

While the present invention has been described with regard to the preferred embodiments shown by way of example, it will be apparent to those skilled in the art that various modifications, alterations, changes, and/or minor improvements of the embodiments described above can be made without departing from the spirit and the scope of the present invention. Accordingly, it should be understood that the present invention is not limited to the illustrated embodiments, and is intended to encompass all such modifications, alterations, changes, and/or minor improvements falling within the scope of the invention defined by the appended claims.

What is claimed is:

1. A controller for a host device and a monitoring device connected on the basis of DVI standard comprising:

a host device and a monitoring device connected with each other on the basis of DVI standard for digitally transmitting a video signal through at least one optical extension cable based on DVI standard;

a (DDC+5V) signal source that is provided in the host device and generates a (DDC+5V) signal;

at least one external power source that drives attached circuits of the host device and the monitoring device;

a first detector part that detects whether a (DDC+5V) signal transmitted from the host device is the proper signal or not, and the external power source has been turned on or not;

a (DDC+5V) signal transmitting part that transmits a (DDC+5V) signal to the monitoring device only when the proper (DDC+5V) signal is detected in the first detector part as well as the fact that the external power source has been turned on is detected;

a HPD signal source that is provided in the monitoring device and generates a HPD signal as a return signal for the (DDC+5V) signal transmitted to the monitoring device from the (DDC+5V) signal transmitting part;

a second detector part that detects whether a HPD signal generated from the HPD signal source is the proper signal or not;

a power supplying part that supplies the power of the external power source to the attached circuits of the host device and the monitoring device in response to a control signal outputted from the second detector part when the HPD signal is the proper signal;

a third detector part that detects the power supply operation of the power supplying part; and a HPD signal transmitting part that transmits the HPD signal to the host device in response to a control signal outputted from the third detector part when the power supply operation of the power supplying part is detected by the third detector part.

2. The controller as set forth in claim 1, wherein the third detector part operates, when it detects the power supply operation of the power supplying part, to output a control signal to the HPD signal transmitting part as well as to cause the external power source to supply its power to the attached circuits of the host device and the monitoring device.

3. The controller as set forth in claim 1, wherein either one of the attached circuit of the host device or the attached circuit of the monitoring device has an external power source connected thereto, or each of the attached circuits of the host device and the monitoring device has an external power source connected thereto.

4. The controller as set forth in claim 2, wherein either one of the attached circuit of the host device or the attached circuit of the monitoring device has an external power source connected thereto, or each of the attached circuits of the host device and the monitoring device has an external power source connected thereto.

* * * * *